Feb. 10, 1953         R. E. KITTREDGE         2,627,675
DYNAMIC PRESSURE COMPUTER AND CONTROL LOADING MEANS
OPERATED THEREBY FOR GROUNDED AVIATION TRAINERS
Filed March 11, 1950                    3 Sheets-Sheet 3

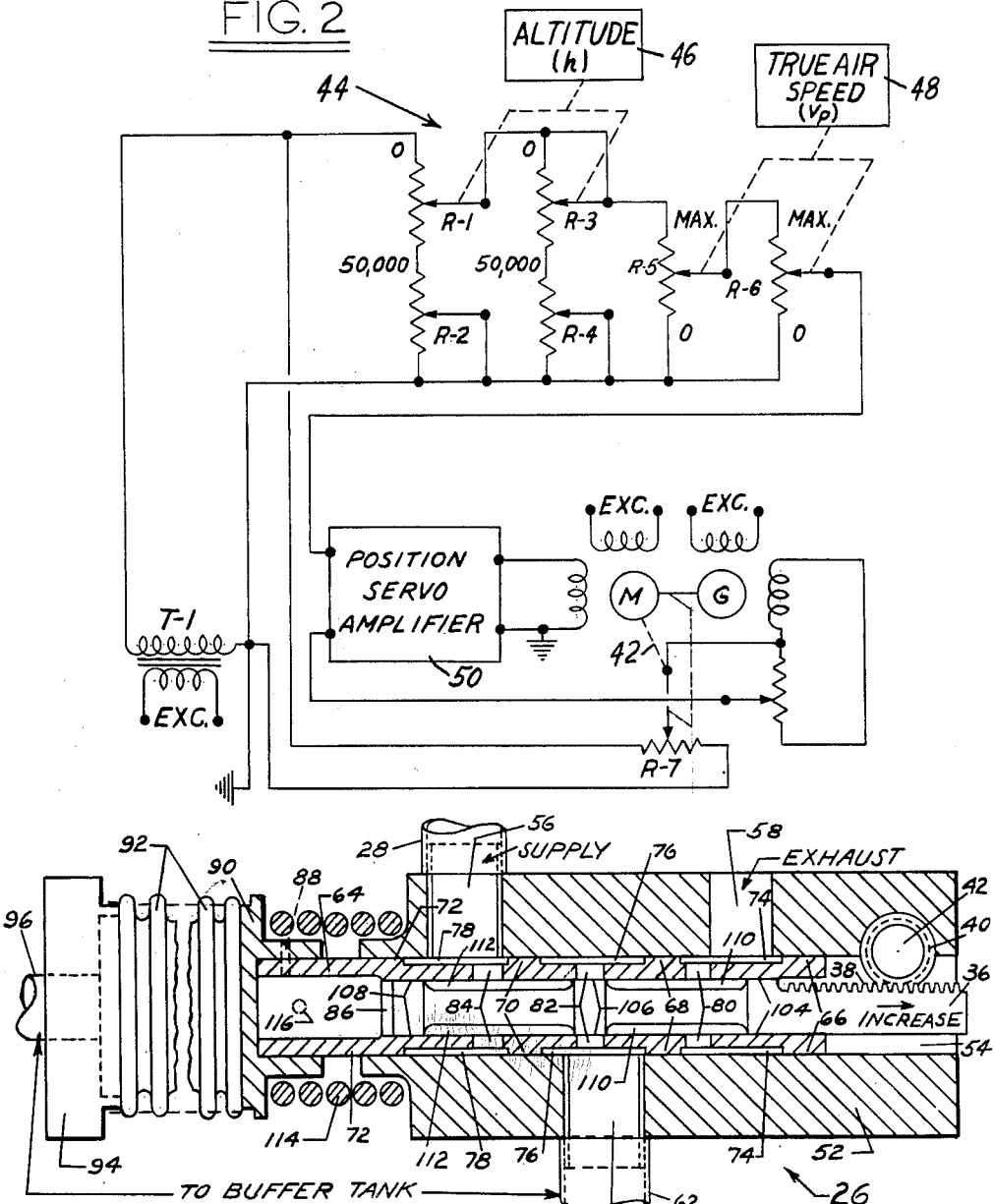

COMBINED TORQUE REQUIRED SYMMETRICAL EACH SIDE

RIGHT SIDE OF LINKAGE

LEFT SIDE OF LINKAGE

INCH POUNDS TORQUE REQUIRED

DISPLACEMENT IN DEGREES

DISPLACEMENT VS FORCE REQUIRED

RAYMOND E. KITTREDGE
INVENTOR.

BY Donald T. Hillier

ATTORNEY

Patented Feb. 10, 1953

2,627,675

UNITED STATES PATENT OFFICE 2,627,675

DYNAMIC PRESSURE COMPUTER AND CONTROL LOADING MEANS OPERATED THEREBY FOR GROUNDED AVIATION TRAINERS

Raymond E. Kittredge, Chenango, N. Y., assignor to Link Aviation, Inc., Binghamton, N. Y., a corporation of New York Application March 11, 1950, Serial No. 149,124

7 Claims. (Cl. 35—12)

This invention relates to means for producing in a grounded aviation trainer variable forces which resist movements of a simulated primary flight control member (rudder pedals, aileron control or elevator control) in the same manner that forces resist movements of the corresponding controls in a real plane in actual flight.

The apparatus includes a dynamic pressure computer and flight control loading means operated thereby, which apparatus computes the assumed dynamic pressure on the control surfaces of the plane represented by the trainer and operates mechanism in the trainer which resist movement of the simulated primary flight control members in the trainer from their neutral trimmed positions according to the computed assumed dynamic pressure.

The dynamic pressure computer is designed to compute assumed dynamic pressure $q$ according to the standard aerodynamic formula $$q = \tfrac{1}{2} \rho V_p^2$$

Where
$\rho$=air density in slugs per cubic foot, and
$V_p$=true air speed of the plane.

The output of the dynamic pressure computer is utilized to regulate control loading means connected to the flight control in the trainer so that the force resisting a movement of the control from a neutral trimmed position will at all times be directly proportional to the computed dynamic pressure. The control loading means in turn is designed and connected to the flight control to provide a force resisting movement of the control which increases linearly from zero at the trimmed or neutral position to full control displacement.

Specifically, the dynamic pressure $q$ computer comprises an electrical network having an output which actuates a position servo amplifier and motor to position an output member according to the factor $q$. A source of compressed air is provided, and the said output member actuates a servo regulating valve to control the pressure in a buffer tank and air cylinder according to factor $q$. The control loading unit comprises a pivotally mounted frame and a double linkage system connected to an air cylinder and its piston as well as to the simulated flight control through a common member. The pressure in the air cylinder variably resists movement of the flight control according to the factor $q$, and the double linkage system is designed so that for any instant value of $q$ the force resisting movement of the flight control varies linearly from zero at the neutral trimmed position to full flight control displacement.

Means are also provided for introducing the factor of control displacement into an attitude or flight computer, as well as for simulating the trimming of the flight control sufrace of the plane represented by the trainer.

In order that the detailed nature of the invention may be thoroughly understood, reference is made to the accompanying drawings, wherein Fig. 1 is a view illustrating the general arrangement of the apparatus of the invention.

Fig. 2 is a wiring diagram of the $q$ computer and position servo amplifier and motor operated thereby.

Fig. 3 is a view, partly in section, of the servo regulating valve and associated parts.

Fig. 4 shows the dimensions of one form of control loading linkage system, and

Fig. 5 is a graph showing the torque required to operate the system shown in Fig. 4.

Figure 1:
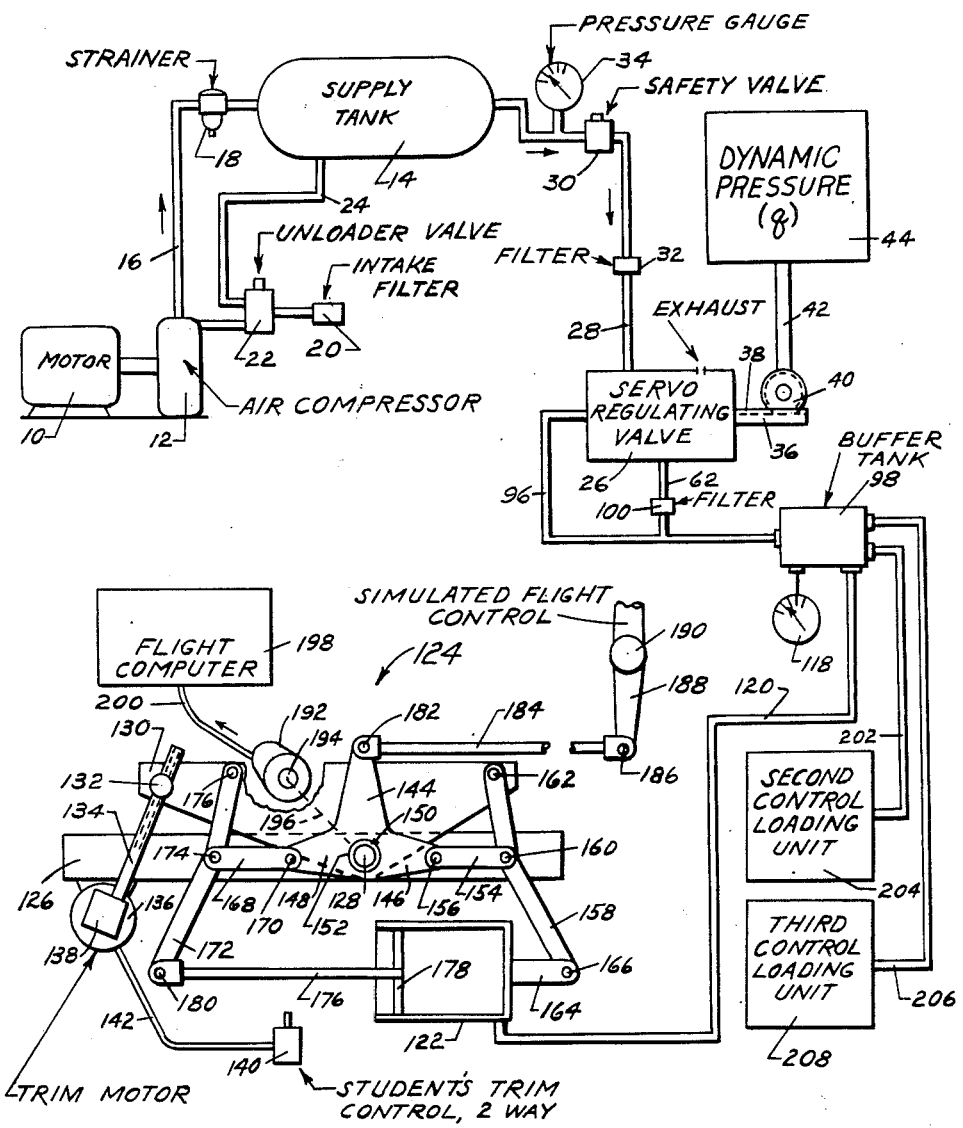

Referring to Fig. 1, there is provided a motor 10 which drives an air compressor 12 connected to a supply tank 14 through the pneumatic line 16 having the strainer 18 therein. The intake to the compressor is through an intake filter 20 and an unloader valve 22, which valve is connected to the supply tank 14 through a line 24 to maintain the pressure in the supply tank at a constant level, e. g., 70 p. s. i. The pressure from the supply tank is transmitted to a servo regulating valve 26 through a pneumatic line 28 in which is placed a safety valve 30 and filter 32, and connected to which is the pressure gauge 34.

The servo regulating valve 26 (Fig. 3) includes an inner piston 36 having teeth 38 on its upper side meshing with the pinion 40 on shaft 42 which is positioned by a dynamic control loading computer 44 (Fig. 1) shown in block form. Reference is made to Fig. 2 where the dynamic pressure $q$ computer is shown to comprise the series-parallel potentiometer and resistor network including members R–1, R–2, R–3, R–4, R–5 and R–6.

Transformer T–1 supplies an excitation voltage to the potentiometers R–1, R–2, R–3 and R–4. Potentiometers R–2 and R–4 are set so that when the arms of potentiometers R–1 and R–3 are positioned by the altitude ($h$) unit in the 50,000 feet assumed altitude positions, the voltage drops across the ends of R–2 and R–4 above the arms thereof are equal, and the voltage taken off by the arm of R–1 corresponds to the maximum $q$ obtainable at an assumed altitude of 50,000 feet.

When the arms of R-1 and R-3 are in the zero assumed altitude positions, the voltage taken off by the arm of R-1 corresponds to the maximum $q$ obtainable at an assumed altitude of zero. Potentiometers R-1 and R-3 are of equivalent value.

Assuming that the lapse rate of temperature change to be standard as altitude changes, the factor $\rho$ changes non-linearly with a change in altitude. As the arms of potentiometers R-1 and R-3 are moved linearly along their respective potentiometers by the altitude ($h$) unit 46 with an increase in assumed altitude, in a manner known to the art, resistance of the parallel circuit comprising the portions of R-1 and R-3 below their respective arms and the portions of potentiometers R-2 and R-4 above their respective arms decreases, while the resistance of the portion of R-1 above its arm increases. The net change of resistance of the series-parallel circuit is a reduction in its resistance, resulting in an increased current flow through the upper portion of R-1 and in an increase in the voltage drop thereacross. Consequently the voltage taken off by the arm of R-1 decreases. This voltage decreases non-linearly in the same manner as the factor $\rho$ decreases with an increase in altitude, assuming that the lapse rate of temperature change is standard as altitude changes. The voltage taken off by the arm of R-1 is applied as excitation to the potentiometer R-5, and is proportional to the factor $\rho$, or stated otherwise the excitation voltage applied to R-5 is proportional to the maximum $q$ obtainable at the instant assumed altitude $h$ of the trainer. The arm of potentiometer R-5 is positioned by the true airspeed ($V_p$) unit 48 according to the instant assumed true air speed of the trainer, in a manner known to the art, and the arm of this potentiometer takes off a voltage proportional to the factor $\rho V_p$, which voltage is applied as excitation to the potentiometer R-6. The arm of potentiometer R-6 is also set according to the factor $V_p$, and consequently takes off a voltage proportional to the factor $\rho V_p^2$. The constant "½" in the equation $q = \frac{1}{2}\rho V_p^2$ is taken into account in the selection of the voltage relation to the factor $q$, and consequently the signal voltage applied from the arm of R-6 to the servo amplifier 50 is proportional to the formula $q = \frac{1}{2}\rho V_p^2$.

To avoid loading, the resistance of potentiometer R-5 is several times, e. g. ten, greater than that of R-1 and R-3, and the resistance of potentiometer R-6 has a similar relation to that of R-5.

The arm of servo follow-up potentiometer R-7, the arm of which is driven by the motor M under the control of the position servo amplifier 50, provides a second voltage input to amplifier 50 which serves as a follow-up control voltage for regulating the direction and magnitude of rotation of the coupled rotors of motor M and generator G, according to changes in the voltage applied to the servo amplifier from the arm of R-6. The foregoing servo amplifier arrangement being conventional, it will be appreciated that the position of the output shaft 42 is at all times a true measure of the instant factor $q$ or assumed dynamic pressure on the control surfaces of the plane represented by the trainer.

Referring now to Fig. 3, the servo regulating valve comprises a body cylinder 52 having a longitudinal cylindrical bore 54 extending completely therethrough. A port 56 connected to the supply line 28, an exhaust port 58, and a third port 60 connecting with the pneumatic line 62 all pass through the cylinder 52 and communicate with the central bore 54. A reciprocable tubular piston 64, having lands 66, 68, 70 and 72 and ports 74, 76 and 78, all extending completely therearound, is provided. The ports 80, 82 and 84 connect the ports 74, 76, and 78 respectively, with the central bore 86 of piston 64. The left end of piston 64 is affixed by pin 88 to the fitting 90 carried by the right end of the collapsible-expansible metallic bellows 92, the left end of which is attached to the fixed frame member 94. The interior of the bellows 92 is connected by pneumatic line 96 to the buffer tank 98 (Fig. 1), to which the previously mentioned line 62 is also connected through filter 100.

The inner piston 36 is fitted inside the tubular piston 64, piston 36 having three lands 104, 106 and 108 and two ports 110 and 112, all extending completely therearound. A compression spring 114 is placed between the left end of cylinder 52 and fitting 90 on bellows 92, while an atmosphere vent 116 is placed in the left end of tubular piston 64.

The servo regulating valve 26, bellows 92 and spring 114 control the pressure in the buffer tank in response to the operation of the dynamic pressure computer 44 to establish in the buffer tank 98 an instant pressure in exact ratio to the computed factor of assumed dynamic pressure. The inner piston 36 is at any instant rectilinearly positioned by shaft 42 according to the instant assumed dynamic pressure. Assuming that the various parts of the servo regulating valve are in balanced positions, as shown in Fig. 3, and that an increase in the factor of assumed dynamic pressure occurs, the inner piston 36 is moved to the right a distance proportional to the magnitude of the change, and the supply tank 14 is connected to the buffer tank 98 through line 28, ports 78, 84, 112, 82, 76 and 60 and the pneumatic line 62. The pressure in the buffer tank increases, as does the pressure in the bellows 92, resulting in an expansion of the bellows and a movement to the right of the right end thereof and of the tubular piston 64, against the compression of spring 114. The pressure in the buffer tank continues to increase until the bellows has expanded against the spring pressure to move the tubular piston to the right the same distance as the inner piston 36 was initially moved, at which time the land 106 overlaps the port 82 to close off the supply line 28 from the line 62 to the buffer tank.

On the other hand, with the valve ports in their said assumed balanced positions, assuming a decrease in assumed dynamic pressure occurs, the inner piston 36 will be moved to the left and the buffer tank will be connected to the exhaust port 58 through line 62 and ports 76, 82, 110, 80 and 74, producing a lower pressure in the buffer tank. As the said pressure decreases, the pressure within bellows 92 likewise decreases, resulting in a collapsing of the bellows by spring 114 and a movement to the left of the right end of the bellows and of the tubular piston 64. The same will continue until the tubular piston 64 has been moved to the left the same distance as inner piston 36 was initially moved in that direction, at which time land 106 will overlap port 82, and the buffer tank will be shut off from the exhaust port.

By selecting a bellows 92 and spring 114 having the desired spring rate, e. g., 60 lb./in., the pressure in the buffer tank 98 may be varied in direct proportion and established at the required level according to the output of the $q$ computer 44.

A pressure gauge 118 (Fig. 1) is connected to the buffer tank, and the pneumatic line 120 transmits the pressure in the tank to the control loading cylinder 122 which forms a part of the control loading unit designated generally by 124. This unit comprises a stationary frame 126, suitably fixed inside the trainer fuselage and a main shaft 128 rotatably mounted in the frame. A movable trim frame 130 is pivotally carried by the shaft 128, and this frame carries a nut 132 through which passes a screw 134 driven by a reversible trim motor 136 through the gear box 138. The trim motor is controlled by the pilot's two-way trim control switch 140 connected to the motor by conductor 142.

A drag arm 144 having two integral arms 146 and 148 is affixed upon the main shaft 128 by a pin 150 passing through a hub 152 integral with the drag arm. Link 154 has its inner end pivoted to the outer end of arm 146 by pivot 156, and the outer end of link 154 is connected to arm 158 by pivot 160, the upper end of arm 158 being connected to the right end of the movable trim frame 130 by pivot 162 while the lower end of arm 158 is connected by pivot 166 to rod 164 integral with cylinder 122. Link 168 has its inner end connected to the outer end of arm 148 by pivot 170, and the outer end of link 168 is connected to arm 172 by pivot 174, the upper end of arm 172 being connected to the left end of the movable trim frame 130 by pivot 175 while the lower end of arm 172 is connected by pivot 180 to the piston rod 176 which is connected to the piston 178 in cylinder 122. Pivot 182 connects the upper end of drag arm 144 to the left end of link 184, the right end of which is connected by pivot 186 to the lower end of the simulated flight control member 188 in the cockpit of the fuselage (not shown). Member 188 is carried by pivot 190 which in turn is suitably affixed within the trainer fuselage. The member 188 may be the simulated rudder, elevator or aileron control in the trainer.

The self-synchronous transmitter 192 has its rotor 194 suitably connected to shaft 128 by the schematically shown connection 196, which may for example be gearing, and this transmitter is connected to a self-synchronous receiver (not shown) in the attitude or flight computer 198 through cable 200. This computer computes such factors as assumed air speed, altitude vertical speed and flight attitude of the plane represented by the trainer, as is well known in the art.

Considering now the operation of the control loading unit 124, when the simulated flight control 188 is in a neutral trimmed position, the apparatus is positioned as shown in Fig. 1, i. e., the pivots 160, 156, 170 and 174 are in a straight line and the piston 178 and cylinder 122 are in their extended positions. When the pilot in the fuselage displaces the member 188 from the said neutral trimmed position in either direction, both the cylinder 122 and piston 178 move inwardly, the air pressure in the cylinder resisting the said movement of the member 188. The operation of the cylinder and piston instantly minutely increases the pressure in the cylinder, buffer tank 98 and bellows 92, resulting in an expansion of the bellows and a movement to the left of the tubular piston 64, venting the buffer tank through the exhaust port 58 and lowering the pressure in the cylinder, buffer tank and bellows. As the pressure is lowered, the bellows 92 is collapsed, returning the tubular piston to its initial position. When the cylinder displacement is increased by returning the member 188 toward the neutral trimmed position, the piston 64 moves to the right and connects the supply line 28 to the buffer tank for the required interval of time to maintain the pressure in the buffer tank and cylinder at a constant level. Consequently, the pressure in the cylinder 122 is, for practical purposes, maintained at all times at a level proportionate to the factor $q$, regardless of the position of the simulated flight control member 188. In view of this fact, in order to provide a resistance to the movement of the member 188 which increases linearly from zero at any neutral or trimmed position to full control displacement, the three bar linkage system (link 154, arms 146 and 148 and link 168) and arms 158 and 172 are interposed between the pivot 182 and the cylinder 122 and piston 178 to constitute a system the mechanical advantage of which decreases in linear ratio as the simulated flight control 188 and pivot 182 are displaced from a neutral trimmed position. Consequently, as the member 188 is displaced from a neutral trimmed position, the resistance to movement thereof increases linearly.

In substantiation of the accuracy of the arrangement in performing its intended function, reference is made to Figs. 4 and 5. The former figure shows the exact distances between the locations of the pertinent pivot points of one embodiment of the invention, while Fig. 5 shows a graph of the displacement $\delta$ of the diagram 144 in degrees against inch pounds of torque required to displace the piston and cylinder with 100 pounds of force on the piston. The curve designated "Right side of linkage" shows the torque required to produce the displacement by the right side of the three bar linkage and arm 158 acting alone when the arm 144 is moved clockwise in Fig. 1, while the curve designated "Left side of linkage" shows the torque required to produce the displacement by the left side of the three bar linkage and arm 172 when the arm 144 is moved counterclockwise. It will be noted that for a displacement of up to about 30 degrees, the torque required increases substantially linearly with a deflection of the arm 144, and consequently in such cases as it is necessary to simulate deflections up to that magnitude only it may not be necessary to employ the double piston-actuating system disclosed. To change the slope of the curve it is only necessary to change the distance between the axis of shaft 128 and pivot 182. However, at about thirty degrees displacement both curves deviate substantially from the linear, but the combined torque required through both systems acting on the piston and cylinder remains linear up to 40 degrees displacement. Furthermore, for deflections below 30 degrees, the combined torque is perfectly linear.

In order to make provision for varying the load on the primary control member according to the area of the control surface (rudder, ailerons or elevator) of the plane represented by the trainer, it is merely necessary to vary the distance between the pivot 182 and axis of shaft 128.

To simulate the trimming of a flight control surface assumed to be operated by the simulated flight control member 188, which trimming operation is performed when the pilot finds he must apply a constant pressure on the primary flight control to keep the plane in a given desired flight attitude, when the student in the trainer finds he must hold the simulated flight control 188 displaced from a neutral or trimmed position to maintain a given assumed flight attitude of the trainer, the piston and cylinder 122 will be moved inwardly by an amount depending upon the position of the flight control. To trim the trainer the student may operate the two way trim control 140 in the correct direction (up or down for elevator, left or right for bank, and left or right for yaw) to energize the motor 136 in the proper direction to rotate the movable trim frame 130 in the proper direction about the shaft 128 by means of a rotation of screw 134 in nut 132. The rotation of the frame 130 moves arms 158 and 172, links 154 and 168 and piston 178 and cylinder 122 about the axis of shaft 128, but arm 144 is not moved since the simulated flight control 188 is held by the student. When the moving parts reach the position that pivots 160, 156, 170 and 174 are in a straight line, the piston and cylinder will be extended and no pressure will be required upon the simulated flight control 188 to maintain it and the trainer in the assumed trimmed or neutral position. It will be noted that the input to the flight or attitude computer 198 is not operated during the trimming operation, since the position of the simulated flight control 188 remains unchanged.

On the other hand, if instead of holding the simulated flight control 188 in the required position displaced from a neutral or trimmed position to maintain a desired flight attitude the student releases the control, pivots 160, 156, 170 and 174 return to a straight line position. If the student then operates the trim motor to bring the trainer into an assumed trimmed condition by reference to the instruments upon the panel (not shown) in the trainer, the positions of the four pivots 160, 156, 170 and 174, arms 158 and 172, piston 178, cylinder 122, drag arm 144, and link 184 and the simulated flight control 188 all change, and the input to the computer 198 is also operated.

The foregoing accurately simulates the operation and effects of operation of the trim control in a real plane, insofar as the effect upon the position and loading of the simulated flight control in the trainer are concerned, and also introduces into the computer 198 a value corresponding to the position of the simulated flight control.

In Fig. 1 the buffer tank 98 is shown connected through pneumatic line 202 to a second control loading unit 204 and through pneumatic line 206 to a third control loading unit 208. The units 204 and 208 are like the control loading unit 124 and each is connected to a second or third simulated flight control in the trainer and to the attitude or flight computer 198. Consequently, the invention contemplates a control loading unit for each of the simulated flight controls in the trainer, viz, rudder, aileron and elevator controls. The buffer tank 98 loads all three of the controls to change the loading thereof according to the instant assumed dynamic pressure. A single servo regulating valve and dynamic pressure computer suffice to regulate the loading of all three controls.

In order to make provision for varying the load on the primary control member according to the area of the control surface (rudder, ailerons or elevator) of the plane represented by the trainer, it is merely necessary to vary the distance between the pivot 182 and the axis of shaft 128. Consequently, the unit 124 may be employed, with this single modification, in a trainer simulating any airplane.

It will be appreciated that many changes may be made in the exact construction of the invention without departing from the substance thereof as defined in the following claims.

I claim:

1. A system for loading a simulated flight control of a grounded aviation trainer comprising, in combination, a dynamic pressure computer, a servo regulating valve connected to said computer to be controlled thereby, a pneumatic chamber having relatively movable walls for varying the volume thereof, a pneumatic source connected to said chamber through said valve controlled by the dynamic pressure computer for varying the pressure in the chamber according to the output of said dynamic pressure computer, a simulated flight control, and a pair of connections between said simulated flight control and said chamber for effecting relative movement between the walls thereof in the same direction against the pressure within the chamber upon a displacement of said simulated flight control member in either direction from a predetermined neutral position.

2. A system for loading a simulated flight control of a grounded aviation trainer comprising, in combination, a dynamic pressure computer, a pneumatic chamber having relatively movable walls for varying the volume thereof, a pneumatic source connected to said chamber through means controlled by the dynamic pressure computer for varying the pressure in the chamber according to the output of said dynamic pressure computer, a simulated flight control, and a pair of connections between said simulated flight control and said chamber for effecting relative movement between the walls thereof in the same direction against the pressure within the chamber upon a displacement of said simulated flight control member in either direction from a predetermined neutral position, said connections having a combined mechanical advantage decreasing linearly as said simulated flight control is displaced from said predetermined neutral position.

3. A system for loading a simulated flight control of a grounded aviation trainer comprising, in combination, a dynamic pressure computer, a servo regulating valve and a pneumatic supply connected thereto, a pneumatic chamber having relatively movable walls for varying the volume thereof, a connection between sad computer and said valve, and a connection between said valve and said chamber for regulating the pressure in said chamber according to the output of the dynamic pressure computer, a simulated flight control member, and a pair of connections between said simulated flight control member and said chamber for effecting relative movement between the walls thereof in the same direction against the pressure within the chamber upon a displacement of said simulated flight control member in either direction from a predetermined neutral position.

4. A system for loading a simulated flight control of a grounded aviation trainer comprising, in combination, a dynamic pressure computer, a servo regulating valve and a pneumatic supply connected thereto, a pneumatic chamber having relatively movable walls for varying the volume thereof, a connection between said computer and said valve and a connection between said valve and said chamber for regulating the pressure in said chamber according to the output of the dynamic pressure computer, a simulated flight control member, and a pair of connections between said simulated flight control member and said chamber for effecting relative movement between the walls thereof in the same direction against the pressure within the chamber upon a displacement of said simulated flight control member in either direction from a predetermined neutral position, said connections having a combined mechanical advantage decreasing linearly as said simulated flight control is displaced from said predetermined neutral position.

5. A system for loading a simulated flight control of a grounded aviation trainer comprising, in combination, a frame, a pair of arms pivoted to the frame, resistance means connected to each of the arms, a dynamic pressure computer, means interconnecting the computer and resistance means for regulating the resistance means according to the output of the dynamic pressure computer, and a connection from the simulated flight control member to each of said arms for moving the same against the resistance means in response to movements of the simulated flight control member, the connections between said simulated flight control member and the resistance means having a combined mechanical advantage decreasing linearly as said simulated flight control is displaced from a predetermined neutral position.

6. A system for loading a simulated flight control of a grounded aviation trainer comprising, in combination, a fixed frame, a shaft carried thereby, a rotatable frame mounted on the shaft, a pair of arms pivoted to the rotatable frame, resistance means connected to each of the arms, a dynamic pressure computer, means interconnecting the computer and resistance means for regulating the resistance means according to the output of the dynamic pressure computer, a simulated flight control member, a connection from the simulated flight control member to each of said arms for moving the same against the resistance means in response to movement of the simulated flight control member, and means for rotating said rotatable frame.

7. A system for loading a simulated flight control of a grounded aviation trainer comprising, in combination, a fixed frame, a shaft carried thereby, resilient control resistance means, a dynamic pressure computer, means operated by the dynamic pressure computer for regulating the resistance means according to the output of the dynamic pressure computer, a simulated flight control member, connecting means between the simulated flight control member and the resistance means rotatably carried by said shaft, said connecting means supporting said resistance means, and means for rotating said connecting means and resistance means about the axis of said shaft.

RAYMOND E. KITTREDGE.

REFERENCES CITED

The following references are of record in the file of this patent:

UNITED STATES PATENTS

| Number | Name | Date |
| --- | --- | --- |
| 2,485,291 | Kail | Oct. 18, 1949 |
| 2,485,292 | Kail | Oct. 18, 1949 |
| 2,510,174 | Heller | June 6, 1950 |
| 2,519,233 | Davis | Aug. 15, 1950 |

FOREIGN PATENTS

| Number | Country | Date |
| --- | --- | --- |
| 575,688 | Great Britain | Feb. 28, 1946 |